Figures 1, 2, 3, 4, 5:
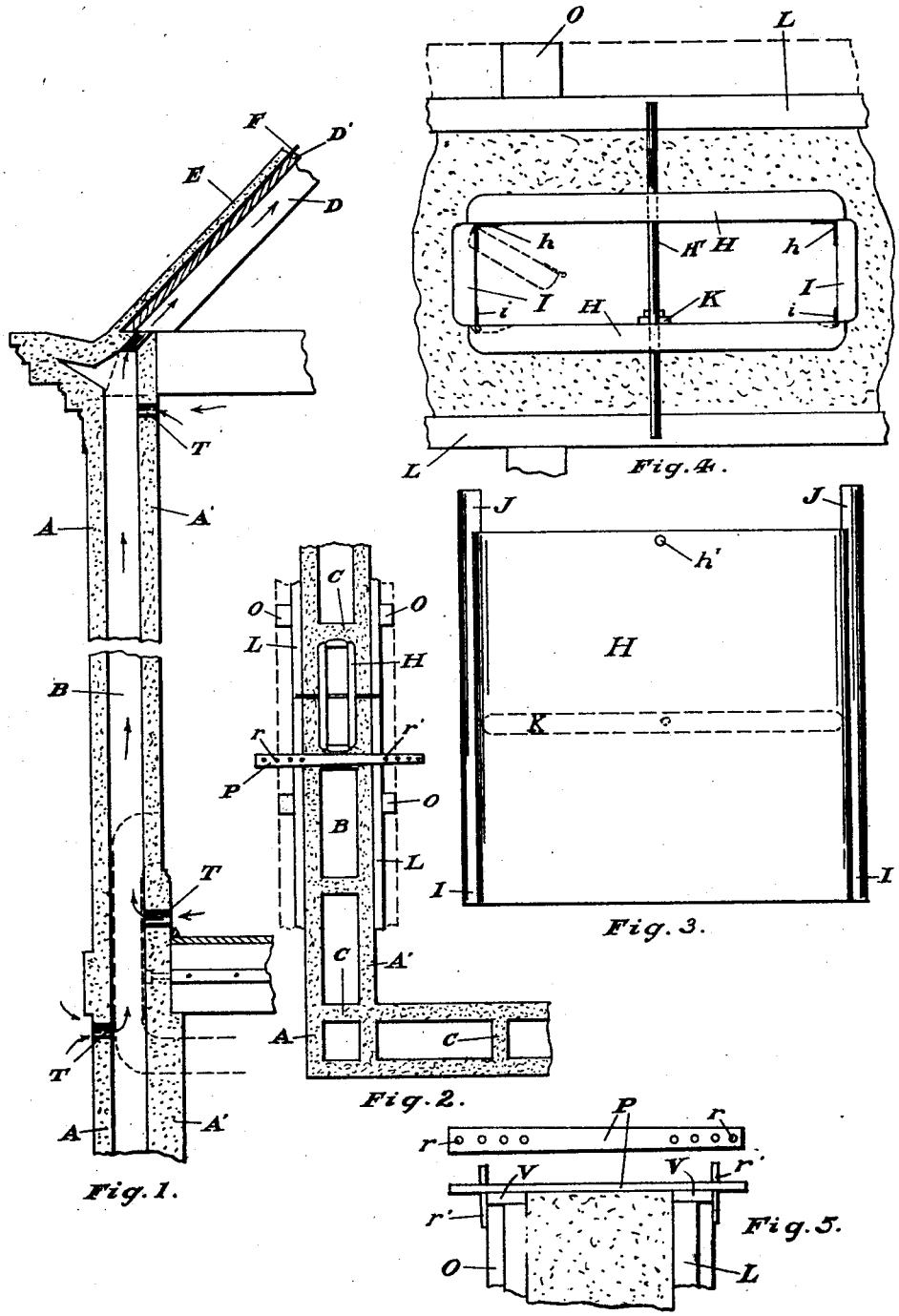

No. 814,154. PATENTED MAR. 6, 1906.
A. McCAHON.
MOLD FOR CEMENT BUILDING WALLS.
APPLICATION FILED MAR. 17, 1905.

Witnesses:
A. Ben Cornelius
Henry J. Dohrer

Inventor:
Alexander McCahon
by Eugene Ayres,
Attorney.

UNITED STATES PATENT OFFICE.

ALEXANDER McCAHON, OF ST. JOSEPH, MISSOURI.

MOLD FOR CEMENT BUILDING-WALLS.

No. 814,154.    Specification of Letters Patent.    Patented March 6, 1906.

Application filed March 17, 1905. Serial No. 250,680.

*To all whom it may concern:*

Be it known that I, ALEXANDER MCCAHON, a citizen of the United States, residing at St. Joseph, in the county of Buchanan and State of Missouri, have invented certain new and useful Improvements in Molds for Cement Building-Walls; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to core-boxes for molding cement walls for buildings and other structures hollow and without joints for the purpose of obtaining strength, ventilation, and exemption from dampness.

I attain my object in the manner hereinafter set forth and by the mechanism illustrated in the accompanying drawings, in which—

Figure 1 is a vertical sectional end view of the spaced walls of a building and a cement roof with the ventilation-space extending to the cone thereof. Fig. 2 is a plan of the walls and ventilation, a core-box, and a flask for forming the cement of said walls. Fig. 3 is a side view of a core-box; Fig. 4, a detail end view of a core-box as set between the walls while the cement is hardening, forming walls at its sides and ribs at its ends, and the flask that forms the outside of the walls; and Fig. 5 is a detail of a clamp for holding the flask in position.

Similar letters refer to similar parts in the several views.

In the drawings, A represents the outside wall, A' the inside wall, and B the ventilation-space between the walls. The footing of the foundation of the walls is preferably built solid; but from a point somewhat below the lower joists to the cone of the roof the space extends unobstructed except only by ribs C C for tying the walls together. The roof consists of rafters D D, sheathing D', a layer E of cement, and between the cement and sheathing a layer of tar-paper F. Said paper F being unattached to the sheathing and separating the cement therefrom prevents the cement being cracked by the shrinkage and expansion of the sheathing.

H H are the sides of a core-box, and I I the ends thereof. Said box is constructed of any suitable material. The cement walls are built against sides H H of said box and ribs C C are formed between ends I I, the boxes being spaced apart as desired.

$h\ h$ are hinges, and $i\ i$ are hooks.

J J are extensions to ends I I, by which to conveniently grasp and turn ends I I when unhooked.

K is a cross-bar pivoted centrally on the inside of one of sides H H. When the cement at the sides of the core-box has sufficiently hardened, ends I I are unhooked by rotating cross-bar K on its pin to a perpendicular, ends I I being then swung on hinges $h\ h$ toward side H, as shown by dotted line in Fig. 4, and the core-box can be readily lifted to a greater elevation, or it may be taken from between the walls if they are finished. Cross-bar K also serves the purpose of preventing ends I I being pressed in by the cement by merely turning it to the position shown by dotted lines in Fig. 3, its ends set against the sides of said ends I I.

A rod H' is adapted to be inserted through holes $h'\ h'$ near the tops of the sides of the core-box, its ends extending over the tops of a flask, thus supporting the core-box. This flask is constructed of lumber or other suitable material, and in building a wall is used for forming the cement. Preferably it is made about three feet wide and any desired length. L L constitute the sides, and O O the supports. P P are lock-bars, smaller at one end than at the other and adapted to extend over sides L L and provided with holes $r\ r$ to receive pins $r'\ r'$, the pins projecting downward sufficiently far on the outside of the flask to hold it in position. Apertures T T are provided in both outside and inside walls for ventilation. A wall may be constructed with a plurality of spaces. V V are bands of any suitable material extended lengthwise with the flask to hold it rigid. Designs of any description are carved or burned into these flasks, thus impressing upon the outside of the cement walls ornamental or other designs.

What I claim, and desire to secure by Letters Patent, is—

1. The combination with a molding-flask, of the sides of a plurality of cement building core-boxes provided with holes, the ends within the edges of said sides, the hinges and hooks on said ends, a bar pivoted centrally on a side of each box, and the rods engaging with the holes in the sides of said boxes the projecting ends of said rods serving as supports for the core-boxes through engagement with said flask, substantially as set forth and shown.

2. The combination in a cement building core-box, of sides provided with holes, the ends set within the edges of said sides, the extensions on top the end pieces, the hinges and hooks on said ends, the bar pivotally attached centrally to one of said sides adapted to form lock connection with the ends of the box to prevent cement pressing said ends inward, the rod passing through the holes in the sides its ends projecting to engage with supports, substantially as set forth and shown.

In testimony whereof I affix my signature in presence of two witnesses.

ALEXANDER McCAHON.

Witnesses:
CHAS. P. F. JONACLE,
F. W. HOLBROOK.